United States Patent [19]
Corbett et al.

[11] Patent Number: 5,683,117
[45] Date of Patent: Nov. 4, 1997

[54] RETAINER CLIP FOR A CONNECTOR

[75] Inventors: Christopher H. Corbett, New Philadelphia; Thomas L. Welsh, Newcomerstown, both of Ohio

[73] Assignee: Flex Technologies, Inc., Midvale, Ohio

[21] Appl. No.: 572,013

[22] Filed: Dec. 14, 1995

[51] Int. Cl.⁶ .................................................. F16L 35/00
[52] U.S. Cl. .......................... 285/24; 285/305; 285/319; 285/921
[58] Field of Search ............................. 285/305, 24, 319, 285/27, 921

[56] References Cited

U.S. PATENT DOCUMENTS

| | | | |
|---|---|---|---|
| 3,753,582 | 8/1973 | Graham | 285/305 |
| 4,458,552 | 7/1984 | Spease et al. | 74/501 R |
| 4,541,657 | 9/1985 | Smyth | 285/305 |
| 4,601,497 | 7/1986 | Bartholomew | 285/319 |
| 4,681,351 | 7/1987 | Bartholomew | 285/319 |
| 4,721,331 | 1/1988 | Lemelshtrich | 285/305 |
| 4,763,541 | 8/1988 | Spease | 74/501 R |
| 4,951,524 | 8/1990 | Niskanen | 74/502.4 |
| 5,009,454 | 4/1991 | Bartholomew | 285/24 |
| 5,090,747 | 2/1992 | Kotake | 285/305 |
| 5,154,451 | 10/1992 | Washizu | 285/319 |
| 5,171,028 | 12/1992 | Bartholomew | 277/189 |
| 5,269,571 | 12/1993 | Haggard | 285/319 X |
| 5,374,088 | 12/1994 | Moretti | 285/305 |

FOREIGN PATENT DOCUMENTS

| | | | |
|---|---|---|---|
| 530778 | 3/1993 | European Pat. Off. | 285/305 |
| 593937 | 4/1994 | European Pat. Off. | 285/305 |
| 6174166 | 6/1994 | Japan | 285/319 |

Primary Examiner—Dave W. Arola
Attorney, Agent, or Firm—Sand & Sebolt

[57] ABSTRACT

A clip for retaining a conduit trapped in an end of a connector has a pair of resilient legs extending from an arcuate-shaped end member which occupies a relatively small amount of space around the periphery of the connector when the clip is connected thereto. Each of the legs includes an end finger which forms an acute angle with an outside edge of the leg and which locks around the outside of the connector housing when the clip is inserted in one of a pair of opposed slots or apertures formed in the housing. A guide tab extends from the end member and slides into a channel formed in the connector housing to insure that the clip faces the correct direction when inserted into the connector. The legs have chamfered inner front surfaces which slidably engage a front end of the conduit to allow the conduit to deflect the legs apart and slidably move between the legs. A flat back surface of the clip legs cooperates with an enlarged annular collar of the conduit to retain the conduit within the connector. The conduit is released by applying an inward pressure to the end member of the clip whereby a pair of nubs which extend from outer ends of the end member produce a camming action with the connector and deflect the legs outwardly a sufficient distance to allow the retaining collar of the conduit to pass between the legs with the clip remaining installed in the connector.

20 Claims, 5 Drawing Sheets

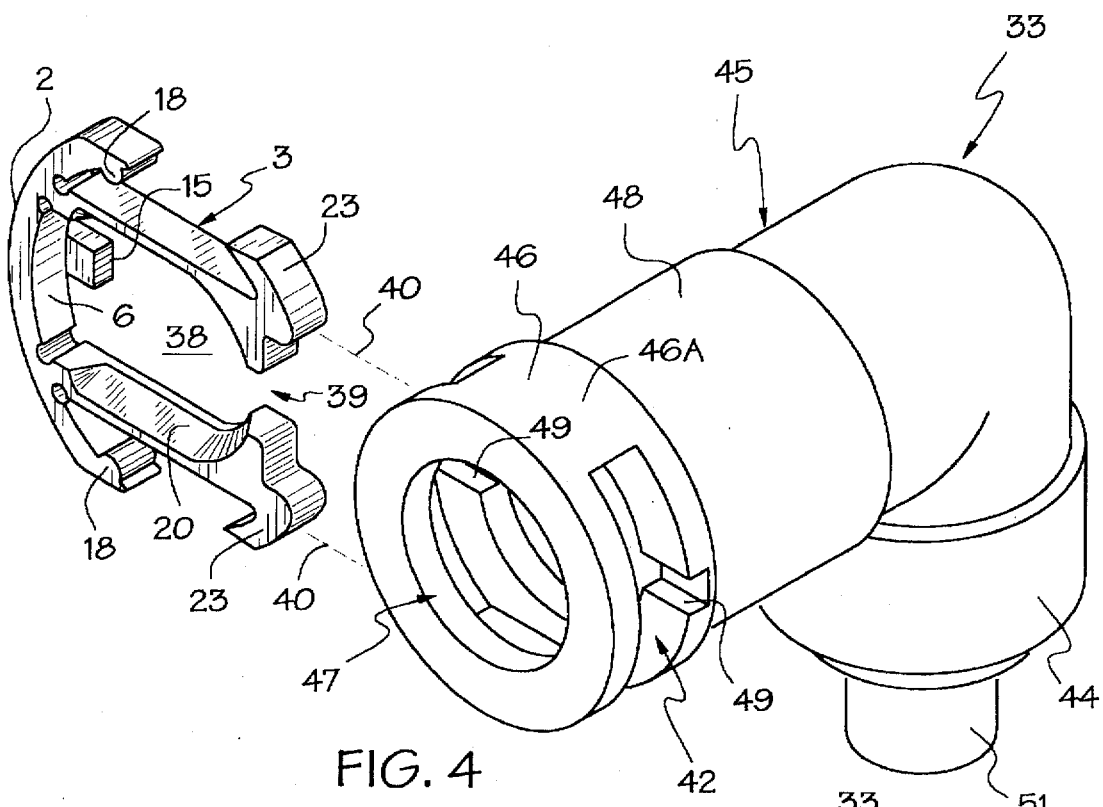
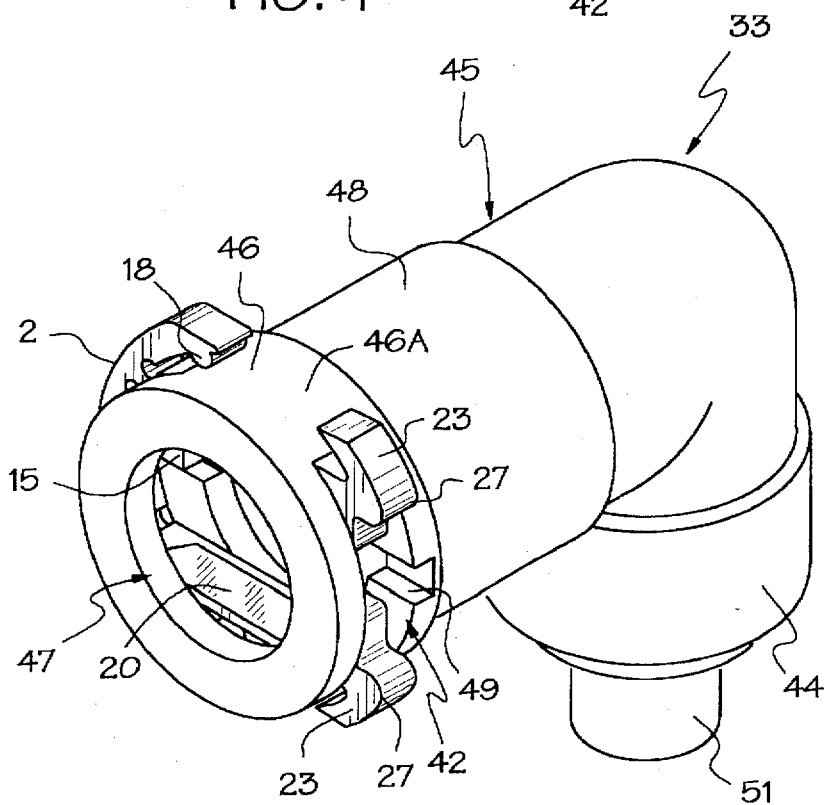

RETAINER CLIP FOR A CONNECTOR

BACKGROUND OF THE INVENTION

1. Technical Field

The invention relates to a retainer clip for quick connect fittings for use in fluid and vapor transmission systems. More particularly, the invention relates to a retainer clip which occupies a small amount of space around the periphery of a receiving end of the connector and which is easily and releasably assembled therein. Even more particularly, the invention relates to a retainer clip which has a chamfered surface to allow a tubular conduit to be snap-fitted into the connector, and which expands to easily release the conduit when manual pressure is applied to the clip.

2. Background Information

Low cost, reliable and easily operated connectors are needed in the automotive industry, as well as other industries, to provide a connection between fluid-carrying conduits, such as fuel or refrigerant lines, and other components of the vehicle, which can be connected easily during assembly of the vehicle and subsequently disconnected for repair at a later date. These connectors require a quick connect mechanism to retain the tubular conduit within the connector.

These retainer clips must be small in size and easy to operate because of the limited amount of space in the location where the connectors are used. For example, in automobiles, and especially in front wheel drive automobiles, the amount of available space under the hood to install and perform maintenance or repairs on these connectors is very limited. A mechanic often has a difficult time reaching into the area under the hood or instrument panel when attaching the connector and to grasp and disassemble the connector and conduit.

Several types of retainer clips are currently available which provide a connection between fluid-carrying conduits. For example, U.S. Pat. No. 5,171,028 discloses a seal retainer with a ring-shaped collar with a lip portion surrounding an opening of the collar and extending axially therefrom. The lip portion is adapted to fit tightly within an axial bore portion of a connector housing. Arm portions extend from the outer circumferential positions of the collar substantially parallel to the center axis in a direction opposite of the lip. The connector and conduit can be separated by depressing the surface areas of the arms.

U.S. Pat. No. 5,009,454 discloses a retainer clip for a swivelable quick connector assembly which includes a collar through which the conduit passes, at least one deflectable bent leg projecting from the collar for securing the conduit in the retainer clip and in the connector, and a mechanism for rotationally orientating the leg with respect to a window formed in the connector.

U.S. Pat. No. 4,681,351 discloses a retainer clip having a collar with an aperture for permitting passage of the conduit through the collar. The collar includes at least two spaced deflectable legs projecting from the body and a clasp secured to the legs for securing the conduit in the retainer element and in the connector. The clasp includes a latch with a catch for securing the clasp on the leg of the body.

Although these prior art retainer clips perform satisfactorily for many applications, they do possess certain inefficiencies and disadvantages. The projecting arms or legs occupy a relatively large amount of space in applications where space is at a premium. An additional amount of space is required beyond the actual space of the retainer clip to allow a mechanic to depress the legs and disassemble the connector assembly.

Related retainer clips are used in motion transmitting remote control assemblies as shown in U.S. Pat. Nos. 4,951,524, 4,458,552 and 4,763,541.

Therefore, the need exists for an improved retainer clip which occupies a small amount of space, which is easily assembled and disassembled in the connector, which allows a conduit to be snap-fitted easily within the connector, and which releases the conduit by merely applying pressure to one end of the retainer clip.

SUMMARY OF THE INVENTION

Objectives of the invention include providing an improved retainer clip for quick connect fittings of the type used in vehicle fluid systems which occupies a relatively small amount of space around the periphery of a receiving end of a connector into which an end of a conduit is slidably inserted.

A further objective of the invention is to provide such a retainer clip which is relatively easy to assemble and disassemble with and from the connector.

A still further objective of the invention is to provide such a retainer clip which has a chamfered surface on one side to allow a conduit to be snap-fitted into the connector and a flat latching edge to retain the conduit therein.

Another objective of the invention is to provide such a retainer clip which allows the conduit to be easily released from the connector by applying a slight amount of pressure to one end of the clip.

Still another objective of the invention is to provide such a retainer clip which has an extending tab which slides into a corresponding slot formed in the connector to insure the clip is properly installed on the connector whereby the chamfered entrance surface of the clip is facing the correct direction for receiving the end of the tubular conduit.

These objectives and advantages are obtained by the improved retainer clip of the present invention, the general nature of which may be stated as including an end member; a pair of spaced legs defining an opening therebetween extending from the end member; a pair of fingers extending outwardly from an outer portion of said legs; a pair of ribs extending inwardly from the outer portion of the legs; and a chamfered surface formed in a surface of the legs and ribs for permitting the passage of the end of the conduit between the legs when the clip is mounted in a slotted opening of the connector.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 4 is a perspective view of the retainer clip of FIG. 1 and one type of connector showing the insertion path of the retainer clip into the connector shown in dot-dash lines;

FIG. 5 is a perspective view of the connector of FIG. 4 with the retainer clip fully inserted therein;

Similar numerals refer to similar parts throughout the drawings.

DESCRIPTION OF THE PREFERRED EMBODIMENT

Figure 1:
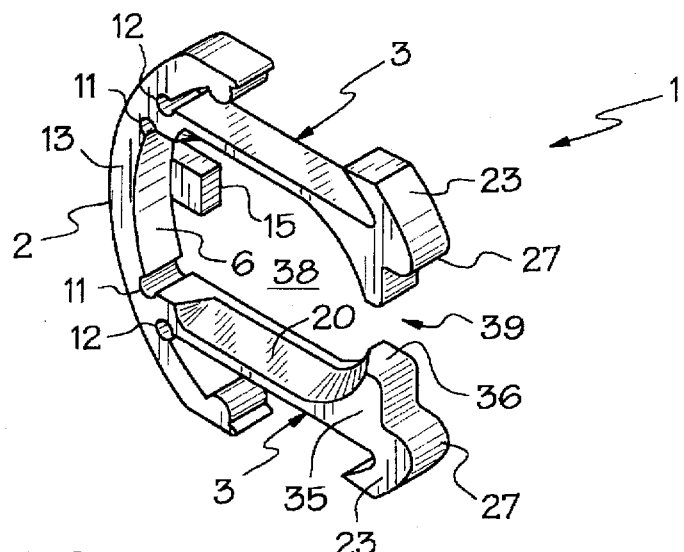
FIG. 1 is a perspective view of the retainer clip of the present invention.
Figure 2:
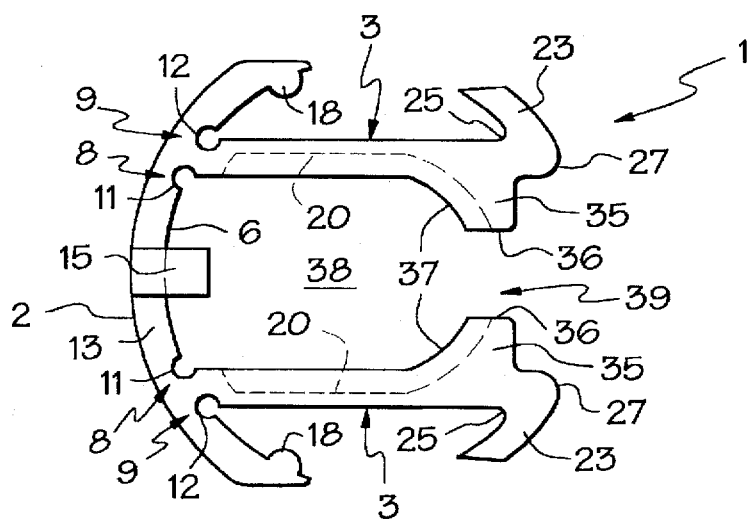
FIG. 2 is a rear plan view of the retainer clip of FIG. 1.
Figure 3:
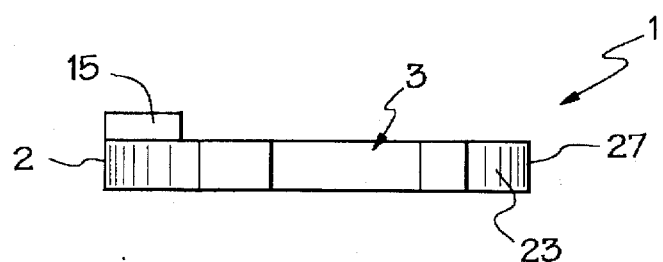
FIG. 3 is a side elevational view of the retainer clip of FIG. 2.

The retainer clip of the present invention is shown in FIG. 1 and is indicated generally at 1. Retainer clip 1 is a one-piece member preferably molded of a resilient material, such as a high strength plastic. Retainer clip 1 includes a pair of spaced generally parallel legs 3 formed integrally at one end with an arcuate-shaped end member 2. Legs 3 extend from a inner concave surface 6 of arcuate end member 2 and form inside and outside corners 8 and 9, respectively, therewith (FIG. 2). Two pairs of partially circular-shaped recesses 11 and 12 are formed in corners 8 and 9, respectively, and provide increased flexibility between end member 2 and legs 3.

A guide tab 15 is positioned centrally along a rear surface 13 of end member 2 and extends orthogonally therefrom (FIGS. 1, 3, 4 and 8), and extends inwardly intermediate and parallel to legs 3. A partially circular nub 18 extends inwardly from each end of concave surface 6 of member 2. End member 2 preferably has an arcuate length of between 115° and 145°, but this length may vary without affecting its operation.

Figure 8:
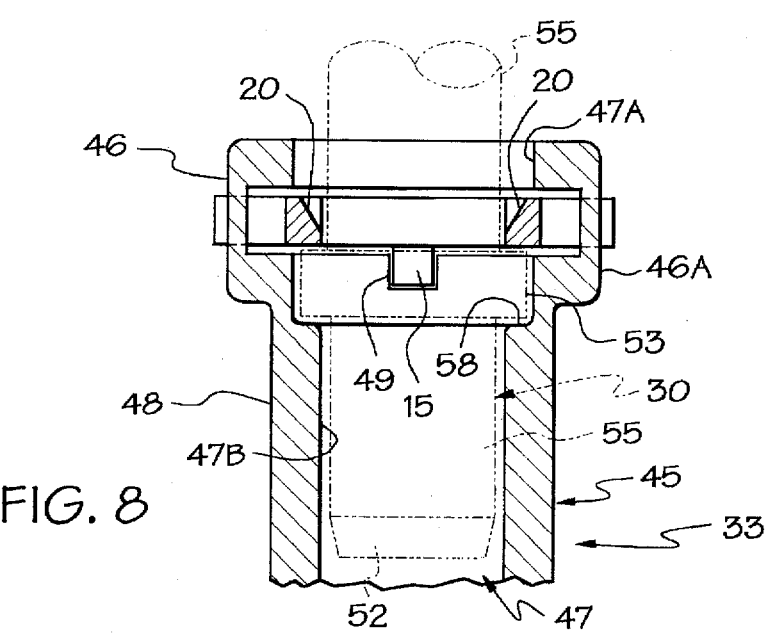
FIG. 8 is a sectional view taken along line 8—8 of FIG. 7.

According to one of the features of the invention, a chamfered surface 20 is formed in a front inner edge of each leg 3 (FIGS. 1, 4, 5 and 8) to allow a conduit 30, shown by dot-dash lines in FIG. 8, to slidably pass therethrough as discussed further below. A pair of deflectable curved fingers 23 (FIGS. 1 and 2) extend outwardly from the free ends of legs 3 and form an acute angle or corner 25 with the outside edge of each leg. A rounded elbow 27 is formed at the junction of fingers 23 and legs 3 to allow for the slidable insertion of retainer clip 1 into a quick connector, indicated generally at 33 (FIGS. 4 and 5). Connector 33 is shown as an elbow connector but clip 1 can be used in connectors of various shapes, such as T-connectors, straight connectors, connectors with service ports, etc., to retain conduit 30 therein.

A curved rib 35 extends inwardly from the inner edge of each leg 3 a short distance from elbow 27. Ribs 35 have a inwardly curved edge 37 across which chamfered surface 20 extends, and terminate in parallel end surfaces 36. Ribs 35, along with legs 3 and end member 2, define an inner opening 38 having an elongated shape which communicates with an end slot or gap 39 defined by the space between end surfaces 36 of ribs 35. The manner of use of clip 1 is best illustrated in FIGS. 4–11 and is described below.

Figure 6:
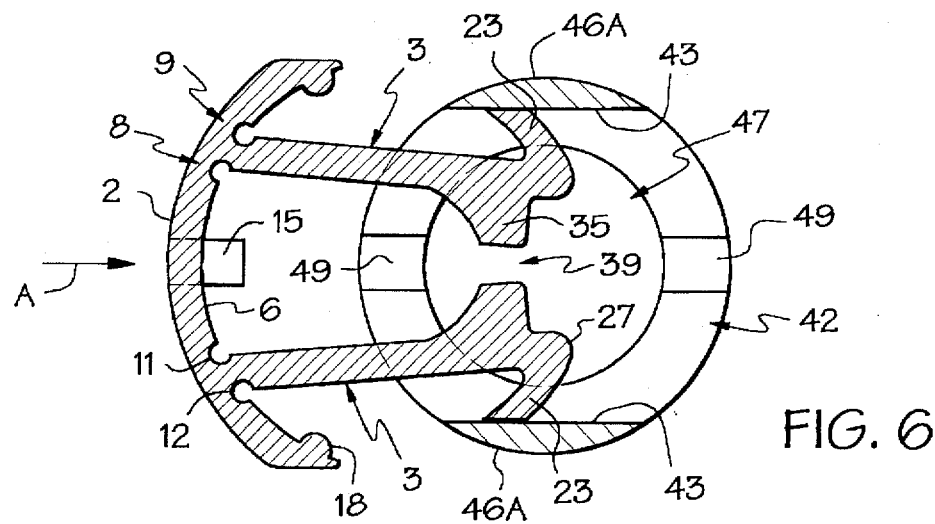
FIG. 6 is a sectional view of the retainer clip shown partially inserted into the connector of FIG. 4.
Figure 7:
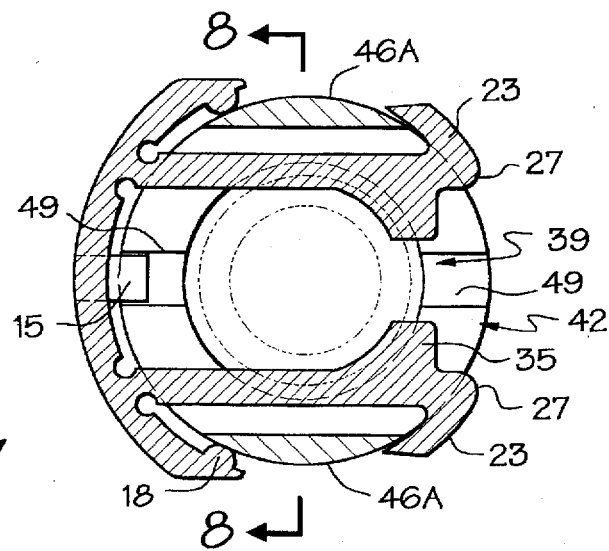
FIG. 7 is a sectional view similar to FIG. 6 with the retainer clip fully inserted into the connector, as shown in FIG. 5, with a retained conduit shown in dot-dash lines.

Retainer clip 1 is inserted into connector 33 as shown by dot-dash lines 40 in FIG. 4. Connector 33 is of the type which includes a cylindrically-shaped front housing 45 formed with a stepped central bore 47, and which may have various outer surface shapes including an enlarged diameter front cylindrical portion 46 (FIGS. 4–8) and a reduced diameter cylindrical rearward portion 48. A pair of identical opposed apertures 42 (FIGS. 4, 6 and 7) are formed in front portion 46 of housing 45 and have an arcuate shape for receiving clip i therein. Each aperture 42 has an arcuate length of approximately 115° and are separated from each other by diametrically opposed arcuate sections 46A of cylindrical portion 46 which have parallel spaced inner surfaces 43 as shown in FIG. 6. Sections 46A each has an arcuate length of approximately 65°. Sections 46A secure clip 1 within housing 45 when clip 1 is in an inserted position therein as shown in FIGS. 5, 7 and 8. Connector 45 has a cylindrical rear end portion 44 in which is secured a usual conduit or hose 51 for transmitting a fluid or vapor between various components of a vehicle or when used in other types of fluid or vapor transmission.

In accordance with the invention, fingers 23 are inserted into one of the apertures 42 producing a sliding cam action between the outside edges of fingers 23 and parallel surfaces 43 of housing sections 46A (FIG. 6). Fingers 23 and thus legs 3 are deflected towards one another narrowing gap 39 as an insertion pressure is applied to clip 1 in the direction of arrow A. Guide tab 15 slides within one of a pair of correspondingly shaped aligned channels 49 (FIGS. 4, 5 and 7) which are formed in portion 46 of housing 45 adjacent and central to apertures 42. Channels 49 allow clip 1 to be inserted into either aperture 42, and along with guide tab 15, insure that chamfered surface 20 of clip 1 faces outwardly when clip 1 is in an inserted position.

Should clip 1 be inserted into one of the apertures 42 in a position opposite to that shown in FIGS. 4 and 5, tab 15 would abut against the outer surface of cylindrical portion 46 opposite channels 49, immediately alerting the installer of the incorrect orientation of clip 1, as well as preventing its full insertion into the selected aperture 42. Apertures 42 and channels 49 enable clip 1 to be inserted only in the correct orientation but from either side of the connector.

Fingers 23 slide along inner surfaces 43 until they exit portion 46 through the other aperture 42. The resiliency of legs 3 causes the legs to snap back to their normal static position, and the outer ends of fingers 23 resiliently engage adjacent areas of sections 46A (FIGS. 5 and 7). When clip 1 is in the inserted position as shown in FIG. 7, arcuate end member 2 extends circumferentially along and closely adjacent to the periphery of portion 46 of housing 45 and in combination with curved fingers 23 only slightly increase the overall diameter of connector 33, as shown particularly in FIG. 7.

When conduit 30 is inserted into a central bore 47 of housing 45 (FIGS. 7 and 8) after clip 1 has been assembled with connector 33, a beveled end 52 of the conduit (FIG. 8) slides along chamfered surfaces 20 of clip 1 into inner opening 38 deflecting legs 3 slightly outwardly expanding opening 38 and gap 39. Conduit 30 is inserted until an outwardly projecting annular surface or collar 53 (FIG. 8) thereof passes through legs 3 and beyond the flat back surfaces of the retainer legs. The resiliency of legs 3 cause the legs to snap inwardly around a narrower cylindrical portion 55 of conduit 30 and cooperate with an annular shoulder 58 formed between enlarged front portion 47A and reduced portion 47B of connector bore 47 to trap conduit collar 53 in connector 33. Legs 3 prevent the removal of conduit 30 from housing 45 of connector 33, as shown in FIGS. 7 and 8.

Figure 9:
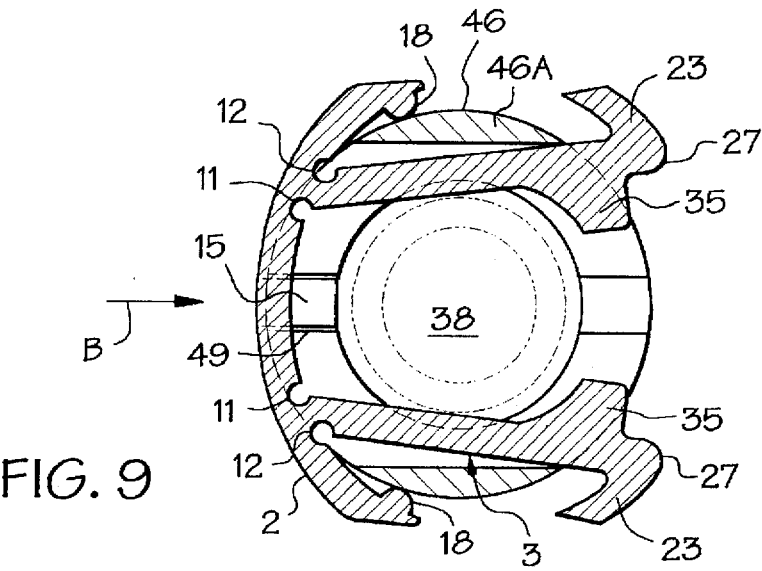
FIG. 9 is a sectional view similar to FIG. 7 showing the retainer clip depressed to permit the conduit to be removed from the connector.

In accordance with another feature of the invention, conduit 30 is removable from housing 45 while retainer clip 1 remains assembled in connector 33 by applying an inward force on end member 2 in the direction of arrow B, FIG. 9. When this force is applied to arcuate member 2, it moves towards the adjacent aperture 42 and nubs 18 produce a cam action against outer surfaces 46A, as shown particularly in FIGS. 10 and 11, causing legs 3 to deflect outwardly toward surfaces 43 expanding gap 39 (FIG. 9) a sufficient distance to permit enlarged annular collar 53 of conduit 30 to pass outwardly between legs 3.

Figure 10:
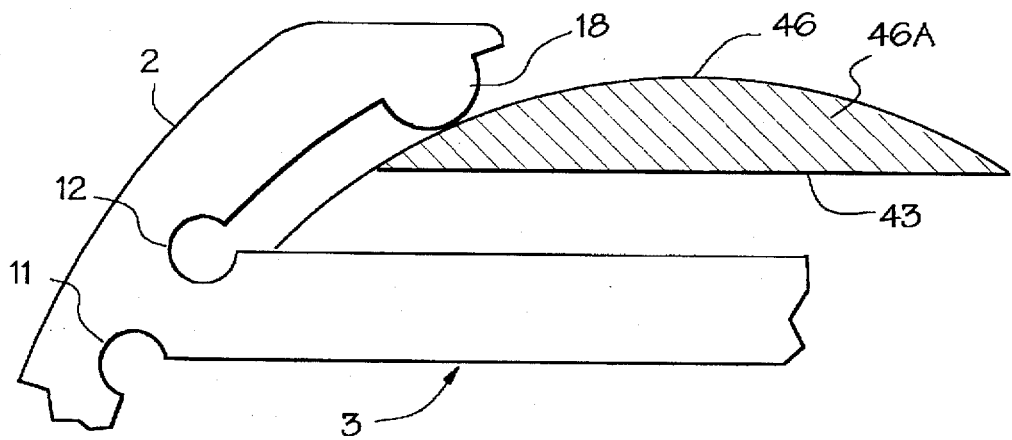
FIG. 10 is a greatly enlarged fragmentary view of a portion of FIG. 9 showing a nub of the retainer clip in contact with the outside edge of the connector.
Figure 11:
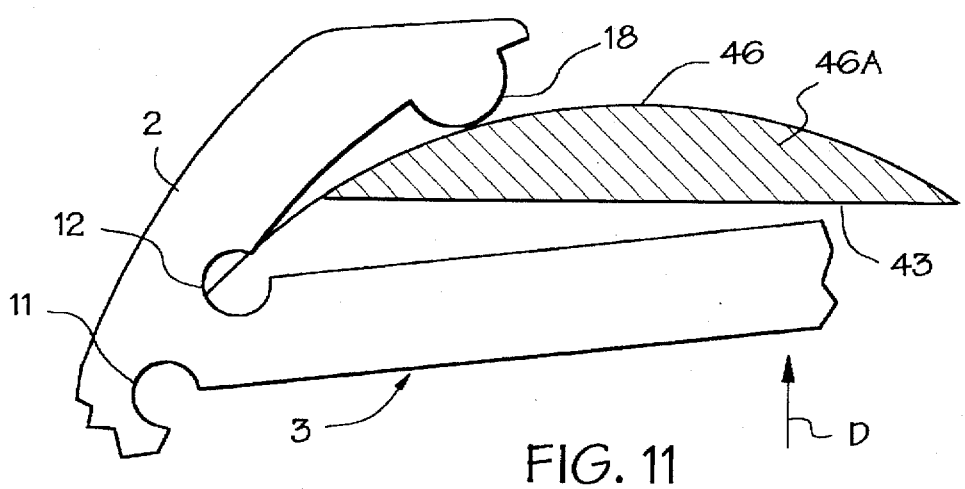
FIG. 11 is an enlarged fragmentary view similar to FIG. 10 showing the cam action of the nub of the retainer clip when the clip is depressed to permit removal of an inserted conduit, as shown in FIG. 9.

FIG. 10 shows one nub 18 in contact with surface 46A when legs 3 are in their locked position with conduit 30, with FIG. 11 showing the sliding movement of the nub along surface 46A when clip 1 is pushed further into connector 33 to spread legs 3 in the outward direction of arrow D.

Accordingly, the unique construction of clip 1 allows it to be mass produced relatively inexpensively by injection molding a one-piece member of a resilient plastic material. Furthermore, retainer clip 1 is easily inserted into apertures 42 of a connector and occupy a small amount of space around the periphery of connector 33 as end member 2 and fingers 23 lock around housing 45 securing the clip in the connector housing. Additionally, chamfered surfaces 20 of legs 3 and ribs 35 allow beveled end 52 of conduit 30 to deflect the legs outwardly a sufficient distance to permit enlarged cylindrical surface or collar 53 of conduit 30 to pass between legs 3. Moreover, the flat back surfaces of legs 3 cooperate with collar 53 to prevent the removal of conduit 30 from housing 45, as long as fingers 3 remain in their at-rest static position. Also, conduit 30 may be removed easily from housing 45 by applying an inward force to the clip in the direction of the connector producing a sliding cam action between nubs 18 and outside surfaces 46A deflecting legs 3 outwardly permitting the passage of retaining collar 53 between legs 3.

Figure 12:
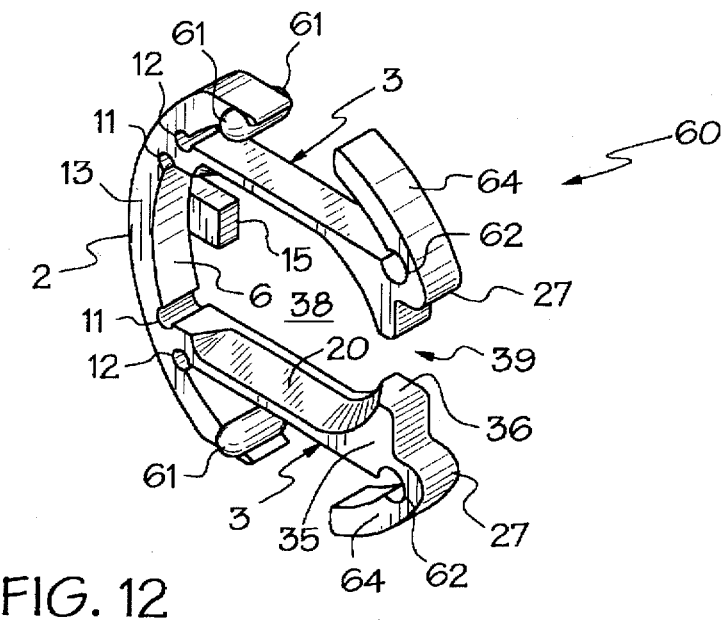
FIG. 12 is a perspective view of a modified retainer clip from the clip shown in FIG. 1.
Figure 13:
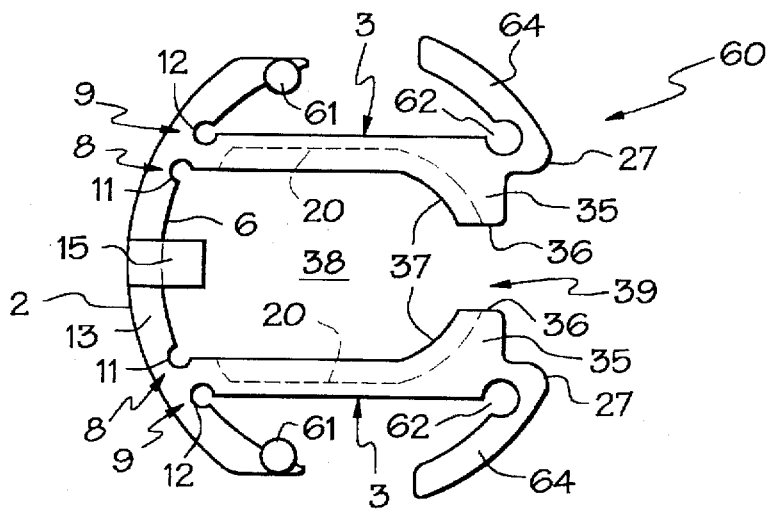
FIG. 13 is a plan view of the modified retainer clip of FIG. 12, similar to that shown in FIG. 2.
Figure 14:
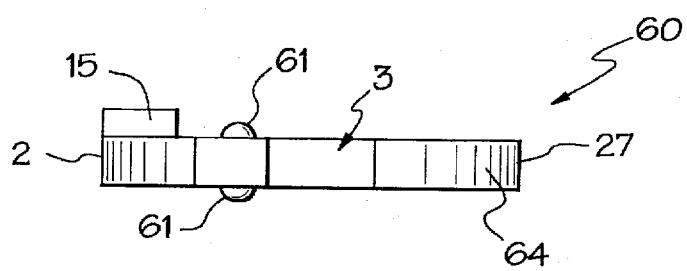
FIG. 14 is a side elevational view of the modified retainer clip of FIG. 13.

A second embodiment of the improved retainer clip is indicated generally at 60, and is shown in FIGS. 12–14. Clip 60 is similar to clip 1 discussed above, with the main differences being that the nubs 18 of clip 1 are replaced with enlarged nubs 61 which extend beyond the side surfaces of end member 2, as shown particularly in FIG. 14. Nubs 61 are similar to each other and have a generally cylindrical configuration terminating in rounded outer ends. Likewise, a pair of generally circular recesses 62 are formed at the junction of elongated fingers 64 to provide increased flexibility to the fingers which, as can be seen from a comparison of FIGS. 2 and 13, are longer than fingers 23 of clip 1.

Nubs 61 prevent the ends of end member 2 from accidentally extending into the arcuate slots or apertures 42 of connector 33, since the longitudinal distance between the rounded ends of nubs 61 is greater than the axial width of connector slots 42. Thus, upon a workman inserting clip 60 into a selected aperture 42 of connector 33, nubs 61 ensure that end member 2 is properly positioned adjacent the outer surface of cylindrical portion 46, and one end thereof cannot accidentally extend or project into the aperture.

By extending the length of fingers 64 greater than that of fingers 23 of clip 1, and by providing recesses 62, sufficient flexibility is achieved by the elongated fingers, enabling the fingers to flex inwardly when moving into a connector, such as shown in FIG. 6. The longer finger length more securely engages the outer surface of member 46 when the clip is in the installed position, such as shown in FIG. 7, to prevent the accidental dislodgement of the clip therefrom, principally during shipment.

Nubs 61 still function in the same manner as do nubs 18 when moving end member 2 inwardly, as shown in FIG. 9. However, longer fingers 64 require a workman to use a second hand to engage the fingers and move the same inwardly toward each other in order to completely remove clip 60 from connector 33.

Thus, modified clip 60 further ensures that the clip is properly installed within a selected aperture 42 of connector 33, and that it remains more securely retained therein when not grasping a conduit, such as during shipment, and will require a two-hand operation to remove the clip, further preventing accidental loss of the clip from the connector during shipment. Likewise, extended fingers 64 further reduce the possibility of the clip becoming disengaged from the connector when retaining a conduit therein.

Accordingly, the improved retainer clip is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved retainer clip is constructed and used, the characteristics of the construction, and the advantageous, new and useful results obtained; the new and useful structures, devices, elements, arrangements, parts and combinations, are set forth in the appended claims.

We claim:

1. A clip for retaining an end of a conduit within a connector, said clip including:
   an arcuate-shaped end member having a concave inner surface with a pair of nubs extending from the concave inner surface adjacent each end of said member;
   a pair of spaced legs defining an opening therebetween extending from the end member with the nubs of said end member extending toward said spaced legs;
   a pair of fingers extending from an outer portion of said legs away from the opening formed therebetween;
   a pair of ribs extending from the outer portion of the legs toward each other; and
   a chamfered surface formed in a surface of the legs and ribs for permitting the passage of the end of the conduit between the legs when the clip is mounted in a slotted opening of the connector.

2. The clip defined in claim 1 in which each of the legs forms inner and outer corners with the end member; and in which a recess is formed in each of the inner and outer corners to increase flexibility of the legs.

3. The clip defined in claim 1 in which a guide tab is formed on and extends from the end member into the opening intermediate and generally parallel to the legs.

4. The clip defined in claim 1 in which the end member, legs, fingers and ribs are formed as a one-piece member of plastic material.

5. The clip defined in claim 1 in which the fingers are curved and extended away from the opening formed between the spaced legs and form an arcuate angle with said legs.

6. The clip defined in claim 5 in which a recess is formed at the junction of each finger and leg to provide flexibility to said finger.

7. The clip defined in claim 1 in which the end member is curved and extends throughout an arc of between 115° and 145°.

8. The clip defined in claim 1 in which the legs extend in a substantially parallel relationship from the end member; and in which the ribs are spaced from each other and form a gap therebetween, said gap being substantially smaller than the opening between the spaced legs.

9. In combination, a connector for attachment to the end of a conduit and a clip for retaining the conduit within said connector, said combination including:

the connector being formed with an outer curved surface, a stepped bore and a pair of opposed apertures communicating with said bore;

the clip having an end member with a pair of spaced flexible legs extending from a surface thereof and through the opposed apertures of the connector, a pair of fingers extending from the legs and biased toward engagement with the connector by the flexibility of the legs to secure the clip within the apertures of the connector, a pair of ribs extending from the legs, and a chamfered surface formed in a front surface of the legs and ribs to permit the passage of the end of the conduit between the legs after the clip has been mounted in the apertures of the connector;

a pair of guide channels formed in the connector; and a guide tab formed on the clip and received within one of the guide channels for positioning the clip in the connector.

10. The combination defined in claim 9 in which a pair of nubs is formed on the end member of the clip and engage the outer curved surface of the connector to produce a camming action against said outer curved surface to deflect the flexible clip legs in a direction to increase the spacing between the legs to permit removal of the conduit from between the legs and from the bore of the connector as the nubs move along said outer curved surface.

11. The combination defined in claim 10 in which the nubs have a greater width than the width of the apertures to prevent the end member from passing into the apertures.

12. The combination defined in claim 10 in which the flexible legs bias the fingers beyond the apertures and into engagement with the outer curved surface of the connector to prevent the legs from being withdrawn from the apertures to secure the conduit within the connector.

13. The combination defined in claim 9 in which the apertures each has an arcuate length of about 115°.

14. The combination defined in claim 13 in which the outer curved surface of the connector comprises two diametrically spaced arcuate surfaces extending between the apertures.

15. The combination defined in claim 9 in which the connector bore has a first bore section adjacent an open front end of the connector and a second bore section having a smaller diameter than the first bore section; and in which said bore sections form an internal shoulder therebetween.

16. The combination defined in claim 15 in which the apertures are formed diametrically opposite of each other and communicate with the first bore section.

17. The combination defined in claim 9 in which a pair of diametrically opposed surfaces extend within the connector bore and between the pair of apertures; and in which the clip fingers slidably engage said surfaces when the clip is inserted into the connector.

18. A clip for retaining an end of a conduit within a connector, said clip including:

an end member;

a pair of spaced legs defining an opening therebetween extending from the end member, said legs forming inner and outer corners with the end member, with a recess being formed in each of said inner and outer corners to increase flexibility of the legs;

a pair of fingers extending from an outer portion of the legs away from the opening formed therebetween;

a pair of ribs extending from the outer portion of the legs toward each other; and a chamfered surface formed in a surface of the legs and ribs for permitting the passage of the end of the conduit between the legs when the clip is mounted in a slotted opening of the connector.

19. A clip for retaining an end of a conduit within a connector, said clip including:

an end member;

a pair of spaced legs defining an opening therebetween extending from the end member;

a guide tab formed on and extending inwardly from the end member intermediate and generally parallel to the legs;

a pair of fingers extending from an outer portion of the legs away from the opening formed therebetween;

a pair of ribs extending from the outer portion of the legs toward each other; and a chamfered surface formed in a surface of the legs and ribs for permitting the passage of the end of the conduit between the legs when the clip is mounted in a slotted opening of the connector.

20. A clip for retaining an end of a conduit within a connector, said clip including:

an end member;

a pair of spaced legs defining an opening therebetween extending from the end member;

a pair of fingers extending from an outer portion of the legs away from the opening formed therebetween, said fingers being curved outwardly and rearwardly from the legs toward the end member and forming an arcuate angle with said legs;

a pair of ribs extending from the outer portion of the legs toward each other; and a chamfered surface formed in a surface of the legs and ribs for permitting the passage of the end of the conduit between the legs when the clip is mounted in a slotted opening of the connector.

* * * * *